US012681505B2

(12) United States Patent (10) Patent No.: US 12,681,505 B2
Wakitani et al. (45) Date of Patent: Jul. 14, 2026

(54) ROBOT MANAGEMENT SYSTEM

(71) Applicant: HONDA MOTOR CO., LTD, Tokyo (JP)

(72) Inventors: Tsutomu Wakitani, Wako (JP); Masaki Ueyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 166 days.

(21) Appl. No.: 18/258,844

(22) PCT Filed: Dec. 28, 2020

(86) PCT No.: PCT/JP2020/049266
§ 371 (c)(1),
(2) Date: Jun. 22, 2023

(87) PCT Pub. No.: WO2022/145020
PCT Pub. Date: Jul. 7, 2022

(65) Prior Publication Data
US 2024/0295886 A1 Sep. 5, 2024

(51) Int. Cl.
G05D 1/69 (2024.01)
G05D 1/224 (2024.01)
(Continued)

(52) U.S. Cl.
CPC ............. G05D 1/69 (2024.01); G05D 1/2247 (2024.01); G05D 1/648 (2024.01); H04L 9/50 (2022.05);
(Continued)

(58) Field of Classification Search
CPC ...... G05D 1/69; G05D 1/2247; G05D 1/6987; G05D 1/648; G05D 1/697; G05D 2105/20;
(Continued)

(56) References Cited

U.S. PATENT DOCUMENTS

| | | | | | |
|---|---|---|---|---|---|
| 8,452,448 | B2 * | 5/2013 | Pack | ...................... | G06N 3/008 700/250 |
| 8,718,814 | B1 * | 5/2014 | Clark | ...................... | G06Q 10/08 |

(Continued)

FOREIGN PATENT DOCUMENTS

| | | | | |
|---|---|---|---|---|
| CN | 111738646 A | * | 10/2020 | ............. G06Q 10/04 |
| JP | 2020-113086 A | | 7/2020 | |
| JP | 2020-160524 A | | 10/2020 | |

OTHER PUBLICATIONS

International Search Report, International Application No. PCT/JP2020/049266, Date of mailing: Mar. 23, 2021, 2 pages.
(Continued)

*Primary Examiner* — Ellis B. Ramirez
(74) *Attorney, Agent, or Firm* — Rankin, Hill & Clark LLP

(57) ABSTRACT

A robot management system includes: a first robot management unit that manages an activity of a first mobile robot taking a first area as an activity range; a second robot management unit that manages an activity of a second mobile robot taking a second area as an activity range; a wide area task accepting unit that accepts a wide area task involving movement from a first point in the first area to a second point in the second area; and a narrow area task setting unit that sets a first narrow area task including movement from the first point in the first area to a relay point in an overlap area and takeover processing to the second mobile robot at the relay point for supporting the second mobile robot to move to the second point, and a second narrow area task including the takeover processing from the first mobile robot 61 at the relay point.

9 Claims, 5 Drawing Sheets

(51) Int. Cl.

| | |
|---|---|
| *G05D 1/648* | (2024.01) |
| *G05D 105/20* | (2024.01) |
| *H04L 9/00* | (2022.01) |

(52) U.S. Cl.
CPC ...... *G05D 2105/20* (2024.01); *H04L 2209/84* (2013.01)

(58) Field of Classification Search
CPC ......... G05D 2105/285; G05D 2107/17; G05D 2109/10; G06Q 10/063; G06Q 10/08; H04L 2209/84; H04L 9/50
USPC ................. 700/248; 709/208, 211, 201, 202; 705/7.21, 7.12, 28; 901/1
See application file for complete search history.

(56) References Cited

U.S. PATENT DOCUMENTS

| | | | | |
|---|---|---|---|---|
| 8,972,045 | B1 * | 3/2015 | Mountz ................ | G06Q 10/087 |
| 10,303,171 | B1 * | 5/2019 | Brady ................. | G05D 1/0088 |

| | | | | |
|---|---|---|---|---|
| 2002/0116289 | A1 * | 8/2002 | Yang ...................... | G06Q 10/08 |
| 2002/0123918 | A1 * | 9/2002 | Brown ................... | G06Q 10/06 |
| 2014/0365258 | A1 * | 12/2014 | Vestal ........... | G06Q 10/063114 |
| 2016/0026186 | A1 * | 1/2016 | Kazama ................. | B65G 1/137 |
| 2016/0176638 | A1 * | 6/2016 | Toebes ................. | G05D 1/0282 |
| 2016/0236869 | A1 * | 8/2016 | Kimura ................ | B65G 1/1378 |
| 2019/0205857 | A1 * | 7/2019 | Bell ........................ | G06Q 10/08 |
| 2020/0242313 | A1 * | 7/2020 | Lemsitzer .......... | G06K 19/0723 |
| 2020/0317449 | A1 * | 10/2020 | Baijens ................ | G01C 21/206 |
| 2021/0018922 | A1 * | 1/2021 | Scheer ................. | B65G 1/1371 |
| 2022/0185340 | A1 * | 6/2022 | Hidaka .................. | G08G 1/146 |

OTHER PUBLICATIONS

Written Opinion of the International Searching Authority dated Mar. 23, 2021 filed in PCT/JP2020/049266, 3 pages.

English translation of the International Preliminary Report on Patentability dated Jul. 13, 2023 issued in corresponding International application No. PCT/JP2020/049266; 5 pages.

* cited by examiner

ROBOT MANAGEMENT SYSTEM

TECHNICAL FIELD

The present invention relates to a robot management system.

BACKGROUND ART

Conventionally, there has been known a robot management system that collectively manages tasks by multiple mobile robots in a specific region (for example, see Japanese Patent Laid-Open No. 2020-113086). For multiple unmanned delivery vehicles, which are exemplary mobile robots, the above Patent Literature describes a system that determines an unmanned vehicle to pick up a parcel that is a collection target in response to a collection request based on the delivery plan of each unmanned vehicle.

CITATION LIST

Patent Literature

[Patent Literature 1]
Japanese Patent Laid-Open No. 2020-113086

SUMMARY OF INVENTION

Technical Problems

As in the above-described conventional robot management system, when, for a large number of mobile robots that are active in a wide-range area, respective tasks of the mobile robots are collectively managed, in order to control respective operations of a large number of mobile robots by recognizing respective operation statuses of these mobile robots in a work target area, a tremendously large amount of data processing is required, which causes a problem that the system becomes complicated.

An object of the present invention, which has been made in light of the above background, is to provide a robot management system capable of efficiently managing execution of tasks involving movement in a wide-range by mobile robots with a simple configuration.

Solution to Problem

In order to achieve the above object, there may be a robot management system including: a first robot management unit that manages an activity of a first mobile robot taking a first area as an activity range and executing a task involving movement in the first area; a second robot management unit that manages an activity of a second mobile robot taking a second area as an activity range and executing a task involving movement in the second area partially overlapping with the first area; a wide area task accepting unit that accepts a wide area task involving movement from a first point in the first area to a second point in the second area; and a narrow area task setting unit that, when the wide area task is accepted by the wide area task accepting unit, sets a first narrow area task and a second narrow area task, the first narrow area task including movement from the first point to a relay point located in the overlap area between the first area and the second area, and takeover processing to the second mobile robot at the relay point for supporting the second mobile robot to move to the second point, the second narrow area task including the takeover processing from the first mobile robot at the relay point, the first robot management unit arranging execution of the first narrow area task by the first mobile robot when the first narrow area task is set by the narrow area task setting unit, and the second robot management unit arranging execution of the second narrow area task by the second mobile robot when the second narrow area task is set by the narrow area task setting unit.

The above robot management system may be configured such that the takeover processing includes processing of providing information on an execution history of the first narrow area task to the second mobile robot from the first mobile robot.

The above robot management system may be configured such that the first mobile robot operates in accordance with a remote control by a first user, and the information on the execution history of the first narrow area task includes information on the remote control performed by the first user when the first narrow area task is executed.

The above robot management system may be configured such that the first robot management unit manages battery remaining amounts of a plurality of the first mobile robots and determines the timing of charging each first mobile robot based on the battery remaining amount of each first mobile robot and the priority of a task in execution or scheduled to be executed of each first mobile robot.

The above robot management system may be configured such that the first robot management unit manages battery remaining amounts of a plurality of the first mobile robots and arranges takeover of a task in execution between a plurality of the first mobile robots depending on the battery remaining amounts.

The above robot management system may be configured such that the second robot management unit manages battery remaining amounts of a plurality of the second mobile robots and determines the timing of charging of each second mobile robot based on the battery remaining amount of each second mobile robot and the priority of a task in execution or scheduled to be executed of each second mobile robot.

The above robot management system may be configured such that the second robot management unit manages battery remaining amounts of a plurality of the second mobile robots and arranges takeover of a task in execution between a plurality of the second mobile robots depending on the battery remaining amounts.

The above robot management system may be configured to further include a takeover information management unit that manages, by a block chain, information provided to the second mobile robot from the first mobile robot through the takeover processing.

The above robot management system may be configured such that the first area and the second area are set in one building of collective housing or an area within a predetermined radius from a predetermined reference point.

The above robot management system may be configured such that the first mobile robot and the second mobile robot are transport robots that transport an object.

The above robot management system may be configured such that the first mobile robot and the second mobile robot are telepresence robots that are remotely controlled by a user terminal used by a user, and an image captured by the first mobile robot and an image captured by the second mobile robot are displayed on a display unit of the user terminal.

Advantageous Effects of Invention

According to the above robot management system, the management target by the first robot management unit is limited to the activity of the first mobile robot within the first area, and the management target by the second robot management unit is limited to the activity of the second mobile robot within the second area. Accordingly, it is possible to provide the robot management system capable of simplifying the configurations of the first robot management unit and the second robot management unit, to thereby more efficiently manage execution of tasks involving movement in a wide range by the mobile robots with a simple configuration.

DESCRIPTION OF EMBODIMENTS

1. Management Mode of Mobile Robots by Robot Management System

Figure 1:
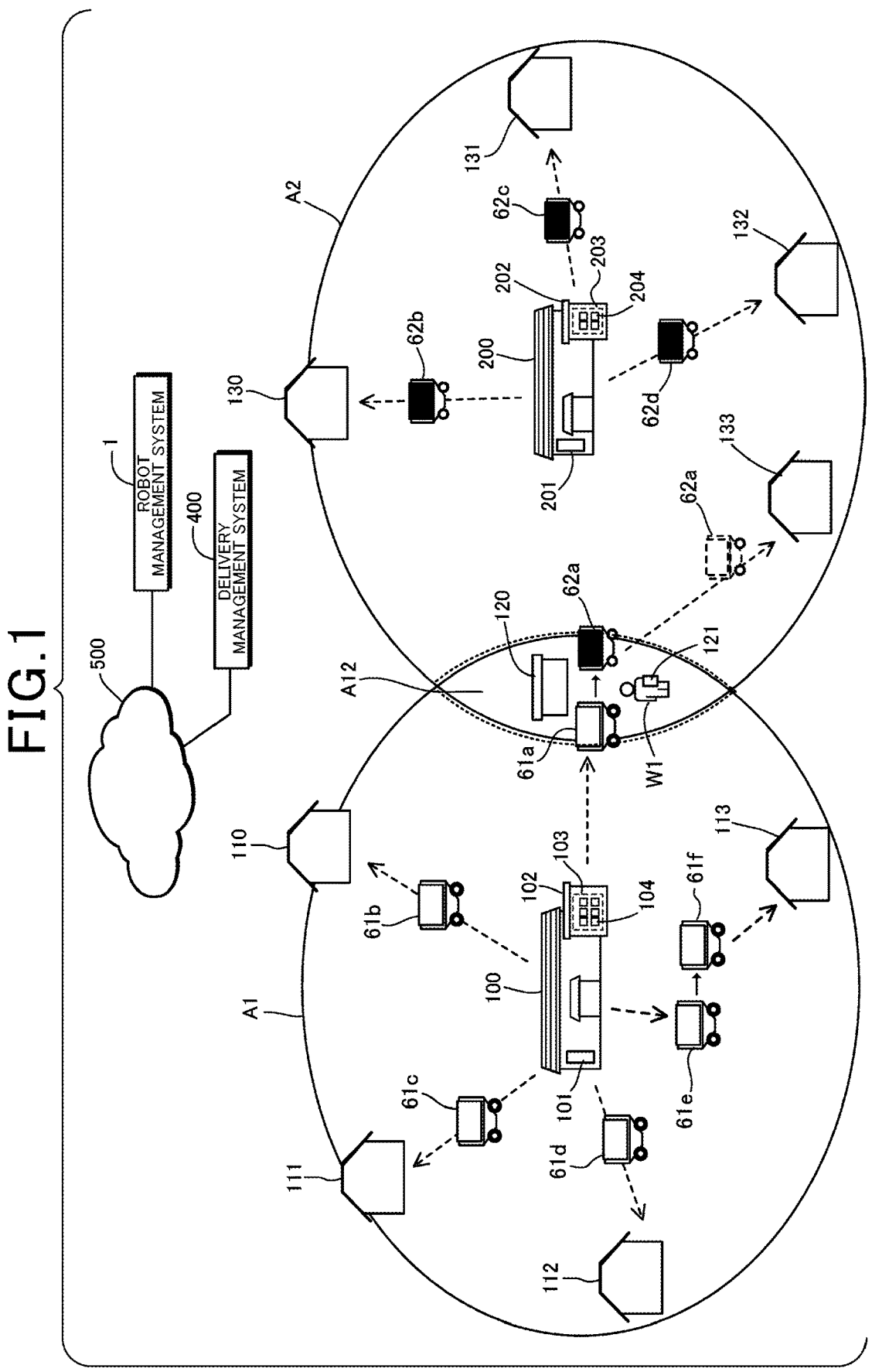
FIG. 1 is an explanatory view of a management mode of mobile robots by a robot management system.

With reference to FIG. 1, management mode of mobile robots by the robot management system 1 of the present embodiment will be described. With reference to FIG. 1, the robot management system 1 separately manages a first mobile robot 61 taking a first area A1 as an activity range and a second mobile robot 62 taking a second area A2 as an activity range. In FIG. 1, as the first mobile robot 61, first mobile robots 61a to 61f are exemplified, and as the second mobile robot 62, second mobile robot 62a to 62d are exemplified. The first area A1 and the second area A2 include an overlap area A12.

The robot management system 1 performs mutual communication, via a communication network 500, with a delivery management system 400 that accepts deliveries of parcels, the first mobile robot 61, the second mobile robot 62, a first store terminal 101 provided in a first store 100 in the first area A1, a second store terminal 201 provided in a second store 200 in the second area A2, and a worker terminal 121 used by a worker W1 who performs a takeover work at a relay station in the overlap area A12.

The first mobile robot 61 and the second mobile robot 62 are self-propelled transport robots powered by batteries. In an example of FIG. 1, in the first area A1, the first mobile robots 61b to 61f receive information on tasks transmitted from the robot management system 1 and execute the tasks of delivering parcels from the first store 100 to houses 110 to 113. Although details will be described later, depending on the battery remaining amount of the first mobile robot 61e, the task is taken over from the first mobile robot 61e to the first mobile robot 61f.

In the second area A2, the second mobile robots 62b to 62d receive information on tasks transmitted from the robot management system 1 and execute the tasks of delivering parcels from the second store 200 to houses 130 to 132.

When receiving request information on a wide area task of delivering a parcel from the first area A1 to the second area A2 accepted by the delivery management system 400, the robot management system 1 divides the wide area task into a first narrow area task executed in the first area A1 and a second narrow area task executed in the second area A2.

FIG. 1 shows an example in which the wide area task of delivering a parcel from the first store 100 in the first area A1 to the house 133 in the second area A2 is executed by performing takeover processing at a relay station 120 in the overlap area A12 between the first mobile robot 61a and the second mobile robot 62a. The second mobile robot 62a receives information on the second narrow area task from the robot management system 1, executes the second narrow area task, moves to the relay station 120, and comes into a standby state.

On the other hand, the first mobile robot 61a receives information on the first narrow area task, moves from the first store 100 to the relay station 120 while carrying the parcel. Then, at the relay station 120, the takeover processing is performed between the first mobile robot 61a and the second mobile robot, and the second mobile robot 62a moves from the relay station 120 to the house 133 while carrying the parcel.

In the first store 100, a spare battery 104 for replacement is accommodated, and a battery station 102 equipped with a charger 103 is installed. Similarly, in the second store 200, a spare battery 204 for replacement is accommodated, and a battery station 202 equipped with a charger 203 is installed.

The robot management system 1 determines the timing of replacement or charging of the battery of the first mobile robot 61 based on information on the battery remaining amount transmitted from the first mobile robot 61, and transmits information on the replacement or charging task of the battery to the first mobile robot 61. In response to receipt of the information on the replacement or charging task of the battery, the first mobile robot 61 performs replacement or charging of the battery at the first store 100.

Similarly, the robot management system 1 determines the timing of replacement or charging of the battery of the second mobile robot 62 based on information on the battery remaining amount transmitted from the second mobile robot 62, and transmits information on the replacement or charging task of the battery to the second mobile robot 62. In response to receipt of the information on the replacement or charging task of the battery, the second mobile robot 62 performs replacement or charging of the battery at the second store 200.

2. Configuration of Robot Management System

Figure 2:
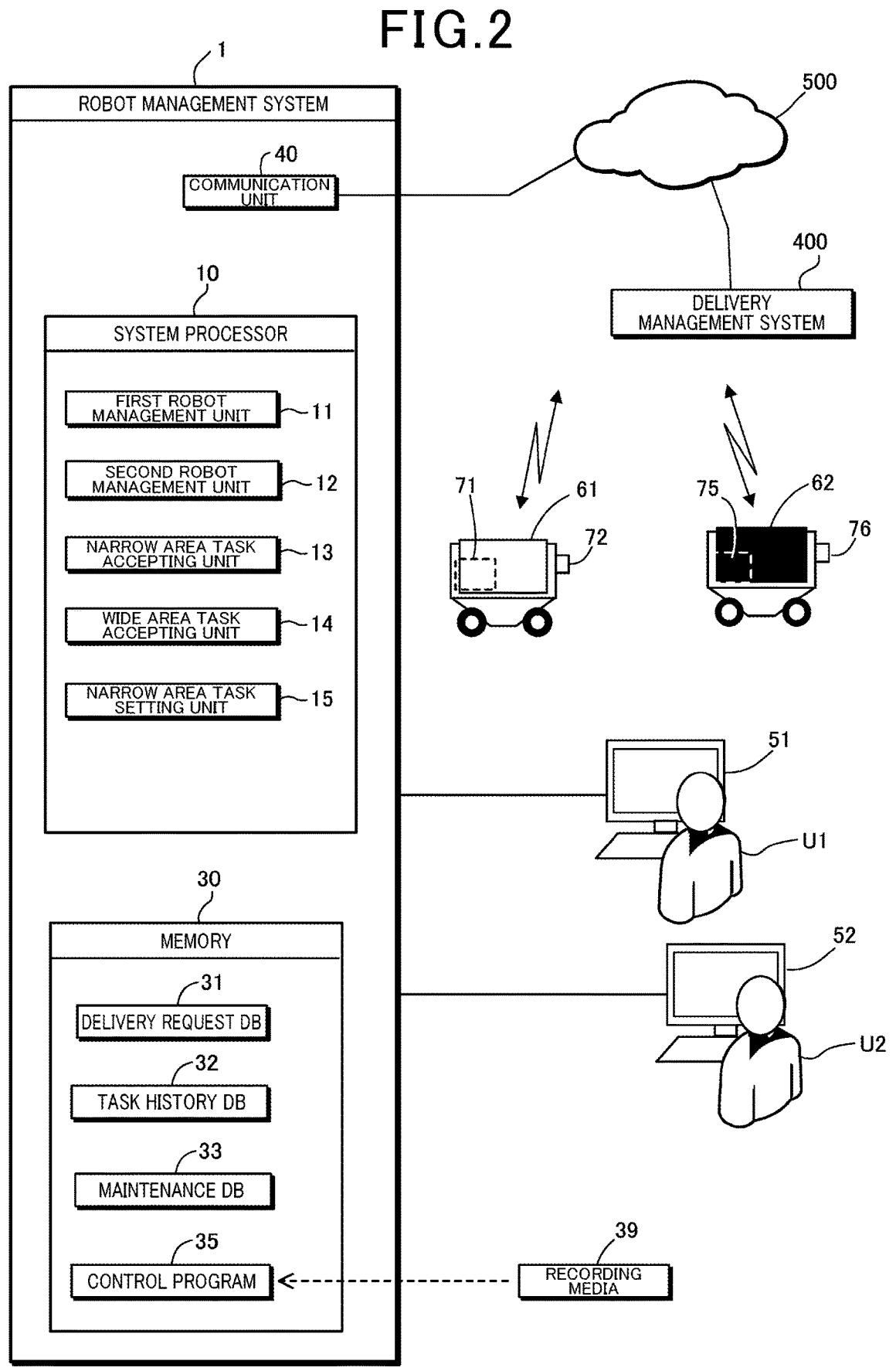
FIG. 2 is a configuration diagram of the robot management system.

With reference to FIG. 2, the configuration of the robot management system 1 will be described. The robot management system 1 is a computer system formed from a communication unit 40, a system processor 10, a memory 30, and others.

The communication unit 40 performs mutual communication, via the communication network 500, with the delivery management system 400, the first mobile robot 61, the second mobile robot 62, the worker terminal 121 (see FIG. 1), etc. The memory 30 stores a delivery request DB (database) 31, a task history DB 32, a maintenance DB 33, and control programs 35 of the robot management system 1. The control programs 35 may be loaded from recording media 39 or downloaded from an external server.

In the delivery request DB 31, information on the delivery request transmitted from the delivery management system 400 is recorded. In the task history DB 32, the histories of the tasks of the first mobile robot 61 and the second mobile robot 62 are recorded. The task histories include information on a task having been executed, a task in execution, and a task scheduled to be executed. In the maintenance DB, information on the maintenance of the first mobile robot 61 and the second mobile robot 62, which is transmitted from the first mobile robot 61 and the second mobile robot 62, is recorded. The maintenance information includes the battery remaining amounts of the first mobile robot 61 and the second mobile robot 62.

The system processor 10 is formed from one or more processors. The system processor 10 functions as a first robot management unit 11, a second robot management unit 12, a narrow area task accepting unit 13, a wide area task accepting unit 14, and a narrow area task setting unit 15 by loading and executing the control programs 35.

The first robot management unit 11 manages execution of the tasks executed by the first mobile robot 61 that is active in the first area A1. The tasks executed by the first mobile robot 61 include the delivery of a parcel by the first mobile robot 61 and the replacement and charging of the battery of the first mobile robot 61, as described above.

Here, the first mobile robot 61 is a self-propelled transport robot equipped with a battery 71 as a power source and a camera 72 that captures the image of the surroundings. The first mobile robot 61 executes a task in the first area A1 set by the first robot management unit 11. The first mobile robot 61 is basically self-propelled while recognizing the surrounding situations from an image or the like of the surroundings of the first mobile robot 61 taken by the camera 72. Note that the image captured by the camera 72 is transmitted from the first mobile robot 61 to the robot management system 1, and a first operator U1 checks the captured image displayed on a first terminal 51, and remotely controls the first mobile robot 61 as necessary. The first operator U1 corresponds to a first user and a user of the present disclosure, and the first terminal corresponds to a user terminal of the present disclosure.

Similarly, the second mobile robot 62 is also a self-propelled transport robot equipped with a battery 75 as a power source and a camera 76 that captures the image of the surroundings. The second mobile robot 62 executes a task in the second area A2 set by the second robot management unit 12. The second mobile robot 62 is basically self-propelled while recognizing the surrounding situations from an image or the like of the surroundings of the second mobile robot 62 taken by the camera 76. Note that the image captured by the camera 76 is transmitted from the second mobile robot 62 to the robot management system 1, and a second operator U2 checks the captured image displayed on a second terminal 52, and remotely controls the second mobile robot 62 as necessary. The second operator U2 corresponds to a user of the present disclosure, and the second terminal corresponds to a user terminal of the present disclosure.

In FIG. 2, it has been exemplified that the first terminal 51 and the second terminal 52 are connected to the robot management system 1, and the first terminal 51 and the second terminal 52 communicate with the first mobile robot 61 and the second mobile robot 62 via the robot management system 1 and the communication network 500; and the first terminal 51 and the second terminal 52 may be located at positions different from the robot management system 1. In this case, the first terminal 51 and the second terminal 52 communicate with the robot management system 1 via the communication network 500.

The narrow area task accepting unit 13 receives request information on the delivery task in the first area A1 and the delivery task in the second area A2 transmitted from the delivery management system 400 and accepts the delivery task. When the delivery task in the first area A1 is accepted, the first robot management unit 11 transmits information on the delivery task to the first mobile robot 61 to arrange execution of the delivery task by the first mobile robot 61. In addition, when the delivery task in the second area A2 is accepted, the second robot management unit 12 transmits information on the delivery task to the second mobile robot 62 to arrange execution of the delivery task by the second mobile robot 62.

The wide area task accepting unit 14 receives the request information on the delivery task (wide area task) involving movement from the first area A1 to the second area A2, the request information being transmitted from the delivery management system 400, and accepts the wide area task. When the wide area task is accepted, the narrow area task setting unit 15 divides the wide area task into the first narrow area task executed in the first area A1 and the second narrow area task executed in the second area A2.

3. Arrangement Processing of Wide Area Task

In accordance with the flowchart shown in FIG. 3, the arrangement processing of the wide area task executed by the robot management system 1 in the situation shown in FIG. 1 will be described.

Figure 3:
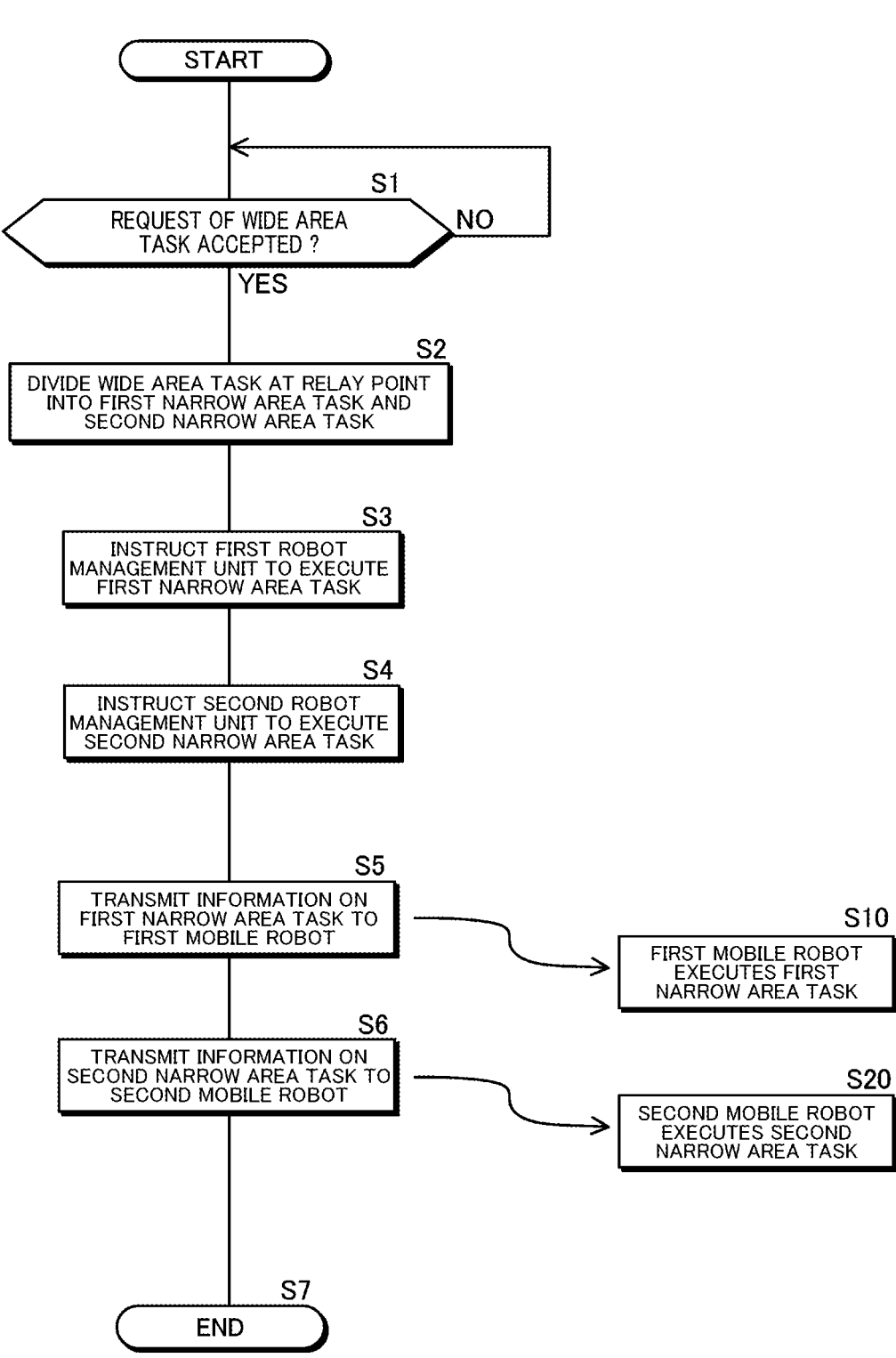
FIG. 3 is a flowchart of arrangement processing of a wide area task.

In step S1 in FIG. 3, upon accepting the wide area task of delivering a parcel from the first store 100 in the first area A1 to the house 133 in the second area A2, the wide area task accepting unit 14 advances the processing to step S2.

In the following step S2, the narrow area task setting unit 15 divides the wide area task into the first narrow area task of delivering the parcel from the first store 100 to the relay station 120 in the first area A1 and performing the takeover processing at the relay station 120, and the second narrow area task of performing the takeover processing at the relay station 120 to perform the takeover processing in the second area A2.

In the subsequent step S3, the narrow area task setting unit 15 instructs the first robot management unit 11 to execute the first narrow area task, and in the subsequent step S4, the narrow area task setting unit 15 instructs the second robot management unit 12 to execute the second narrow area task. In the next step S5, the first robot management unit 11 refers to the task history DB 32 and the maintenance DB 33 to select the first mobile robot 61 that can execute the first narrow area task. In FIG. 1, the first mobile robot 61a is being selected. The first robot management unit 11 then transmits information on the first narrow area task to the first mobile robot 61a selected so as to arrange execution of the first narrow area task by the first mobile robot 61a.

In the subsequent step S6, the second robot management unit 12 refers to the task history DB 32 and the maintenance DB 33 to select the second mobile robot 62 that can execute the second narrow area task. In FIG. 1, the second mobile robot 62a is being selected. The second robot management unit 12 then transmits information on the second narrow area task to the second mobile robot 62a selected so as to arrange execution of the second narrow area task by the second mobile robot 62a.

In step S10, the first mobile robot 61a, having received the information on the first narrow area task, delivers the parcel from the first store 100 to the relay station 120, as shown in FIG. 1. The second mobile robot 62a, having received the information on the second narrow area task, moves to the relay station 120 and comes into a standby state. Then, the first mobile robot 61a and the second mobile robot 62a transfer the parcel between the robots at the relay station 120 and perform transmission and reception of the takeover information between the robots. The transfer of the parcel is performed by the worker W1 or by transfer tools (not shown) equipped to the first mobile robot 61a and the second mobile robot 62a.

The takeover information includes information on the delivery of the parcel from the relay station 120 to the house 133 in the second area A2, handling (such as refrigerating, freezing, shock resistance, etc.) of the parcel, the history of the first narrow area task, and others. Note that as for the information on the second narrow area task, when the information on the delivery of the parcel from the relay station 120 to the house 133 and the handling of the parcel is included in the information on the second narrow area task transmitted from the robot management system 1 to the second mobile robot 62, no takeover is required.

4. Battery Management Processing

In accordance with the flowchart shown in FIG. 4, using the example shown in FIG. 1, the management processing of the battery of the first mobile robot 61 executed by the first robot management unit 11 will be described. In step S30, the first robot management unit 11 refers to the maintenance DB 33 and recognizes the battery remaining amounts of all of the first mobile robots 61 that are active within the first area A1.

In the subsequent step S31, the first robot management unit 11 refers to the task history DB 32 and recognizes the execution status and the execution schedule of the task of each first mobile robot 61. In the following step S32, the first robot management unit 11 determines whether or not there is any first mobile robot 61 having a battery remaining amount equal to or less than a predetermined lower limit level. When there is any first mobile robot 61 having a battery remaining amount equal to or less than the predetermined lower limit level, the first robot management unit 11 advances the processing to step S33, and when there is no first mobile robot 61 having a battery remaining amount equal to or less than the lower limit level, the first robot management unit 11 advances the processing to step S30.

In step S33, the first robot management unit 11 determines whether or not the first mobile robot having the battery remaining amount equal to or less than the lower limit level is executing the task. When the first mobile robot having the battery remaining amount equal to or less than the lower limit level is executing the task, the first robot management unit 11 advances the processing to step S40, and when the task is not accepted, the first robot management unit 11 advances the processing to step S34. Now, when there is a plurality of first mobile robots 61 each having a battery remaining amount equal to or less than the lower limit level, the first robot management unit 11 determines the priority of the first mobile robots 61 for replacement or charging of the battery to be executed, based on the battery remaining amount and the kind of the task of each first mobile robot 61.

In step S34, the first robot management unit 11 determines the timing of the replacement or charging of the battery based on the battery remaining amount, and the execution status and the execution schedule of the task of each first mobile robot 61, and sets the task of charging or replacing the battery. In the following step S35, the first robot management unit 11 transmits the information on the task of charging or replacing the battery to the first mobile robot 61 of interest.

In step S60, the first mobile robot 61, having received the information on the task of replacing or charging the battery, moves to the first store 100 at the specified timing, and replaces or charges the battery.

In step S40, the first robot management unit 11 arranges the takeover of the task between the first mobile robots 61 and transmits information on the task takeover to two first mobile robots 61 that will take over the task. In the example in FIG. 1, the takeover of the task is executed between the first mobile robot 61e having a battery remaining amount equal to or less than the lower limit level during the task execution and the first mobile robot 61f having a sufficient battery remaining amount. The first mobile robot 61e takes over the delivery task to the first mobile robot 61f in the middle of the delivery route from the first store 100 to the house 113.

As for the second mobile robot 62 that is active in the second area A2, the battery remaining amount is managed by the second robot management unit 12 by performing the same processing as the processing performed by the first robot management unit 11 described above.

5. Other Embodiments

In the above embodiment, the processing executed by the robot management system 1 for the first area A1 set around the first store 100 and the second area A2 set around the second store 200 has been described. As another embodiment, as shown in FIG. 5, the present invention is applicable to a case in which one building of collective housing 300 is set in a second area A3.

Figure 5:
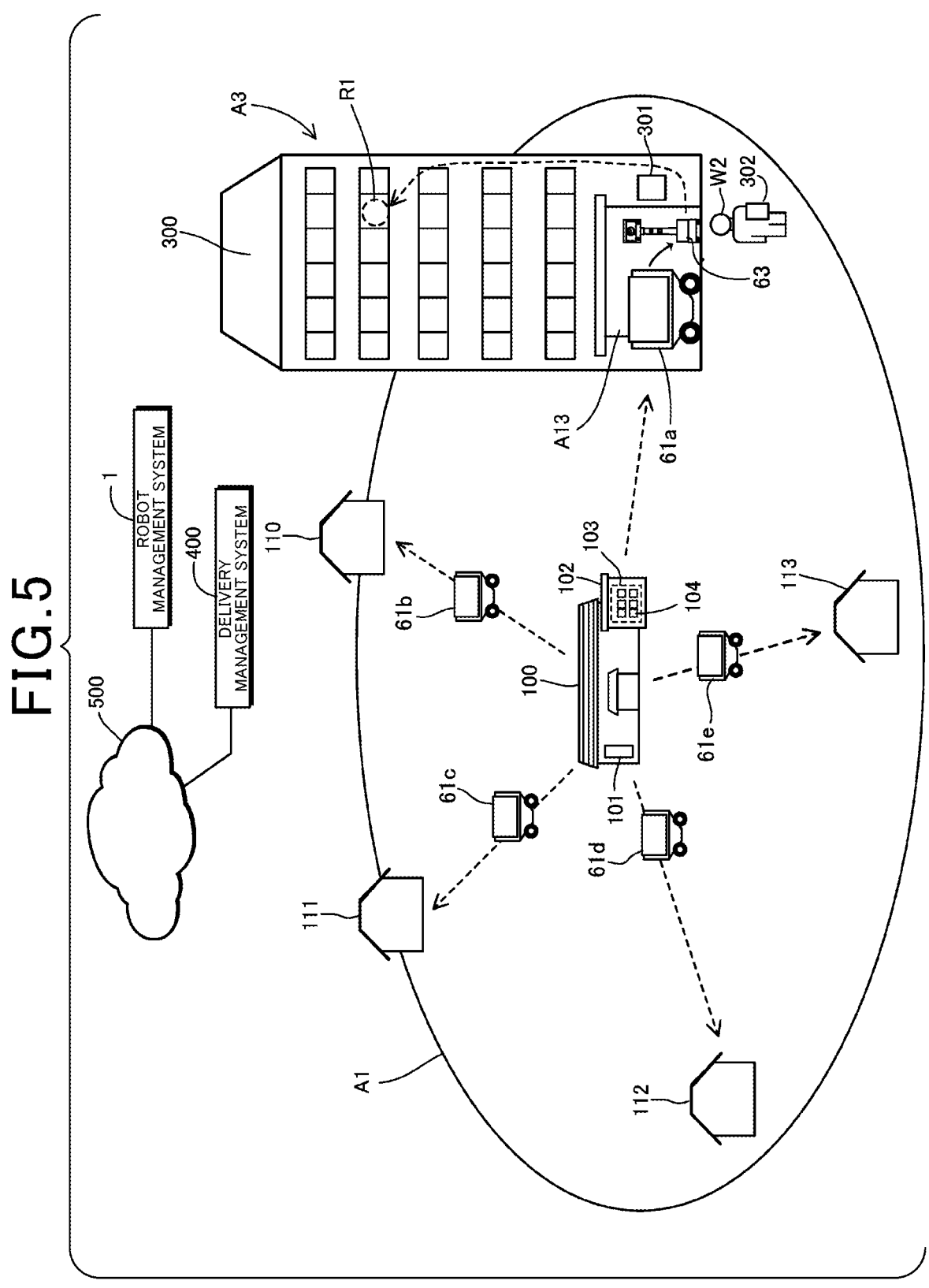
FIG. 5 is an explanatory view of a management mode of mobile robots by the robot management system for collective housing.

In the example of FIG. 5, delivery of a parcel within the collective housing 300 is executed by the second mobile robot 63. The second mobile robot 63 is a presence robot, which is instructed to operate by a remote control by an operator W2 who is a manager of the collective housing 300 or the like. The operator W2 remotely controls the second mobile robot 63 by operating an operating terminal 302 carried by the operator W2 or a management terminal 301 installed in the collective housing 300.

In FIG. 5, the same reference numerals are assigned to configurations common with those in FIG. 1, and description thereof is omitted. In FIG. 5, the wide area task of delivering a parcel from the first store 100 to a room R1 in the collective housing 300 is divided into a first narrow area task of delivering the parcel from the first store 100 to a relay point (e.g., an entrance space of the collective housing 300) of the collective housing 300 and a second narrow area task of delivering the parcel from the relay point to the room R1. The entrance space of the collective housing 300 corresponds to the overlap space between the first area A1 and the second area A3.

In the above embodiment, the information taken over from the first mobile robot 61 to the second mobile robot 62 may be distributed and managed, for example, by a block chain by the robot management system 1 and the delivery management system 400.

In the above embodiment, the delivery robots are exemplified as the first mobile robot 61 and the second mobile robots 62, 63; and the present invention is also applicable to other types of robots as long as they execute tasks involving movement. For example, the present invention can be applied to a telepresence robot that is equipped with, for example, a camera, a microphone, a speaker, etc., and is remotely controlled by a user terminal used by a user to move as an avatar of the user. A captured image by the camera of the telepresence robot is transmitted to the user terminal and is displayed on a display unit of the user terminal, and the user uses the microphone and the speaker of the user terminal while checking the image displayed on the user terminal to make communication with a person or persons around the telepresence robot.

By performing the takeover processing between the first mobile robot and the second mobile robot that are telepresence robots at the relay point, it is possible to move the telepresence robots over a wide range while maintaining continuity of the operation by the user. Data to be taken over includes, for example, travel histories such as travel routes to the relay point or the like, data on images captured during the traveling, information on the user identification (ID, etc.), and information regarding spots having visited during the traveling.

Further, the first mobile robot 61 and the second mobile robot 62 in the above embodiments may be telepresence robots equipped with not-shown microphones and speakers in addition to the cameras 72, 76, and further equipped with arms and hands. In this case, the first mobile robot 61 and the second mobile robot 62 function as telepresence robots and also function as transport robot for transporting objects.

Figure 4:
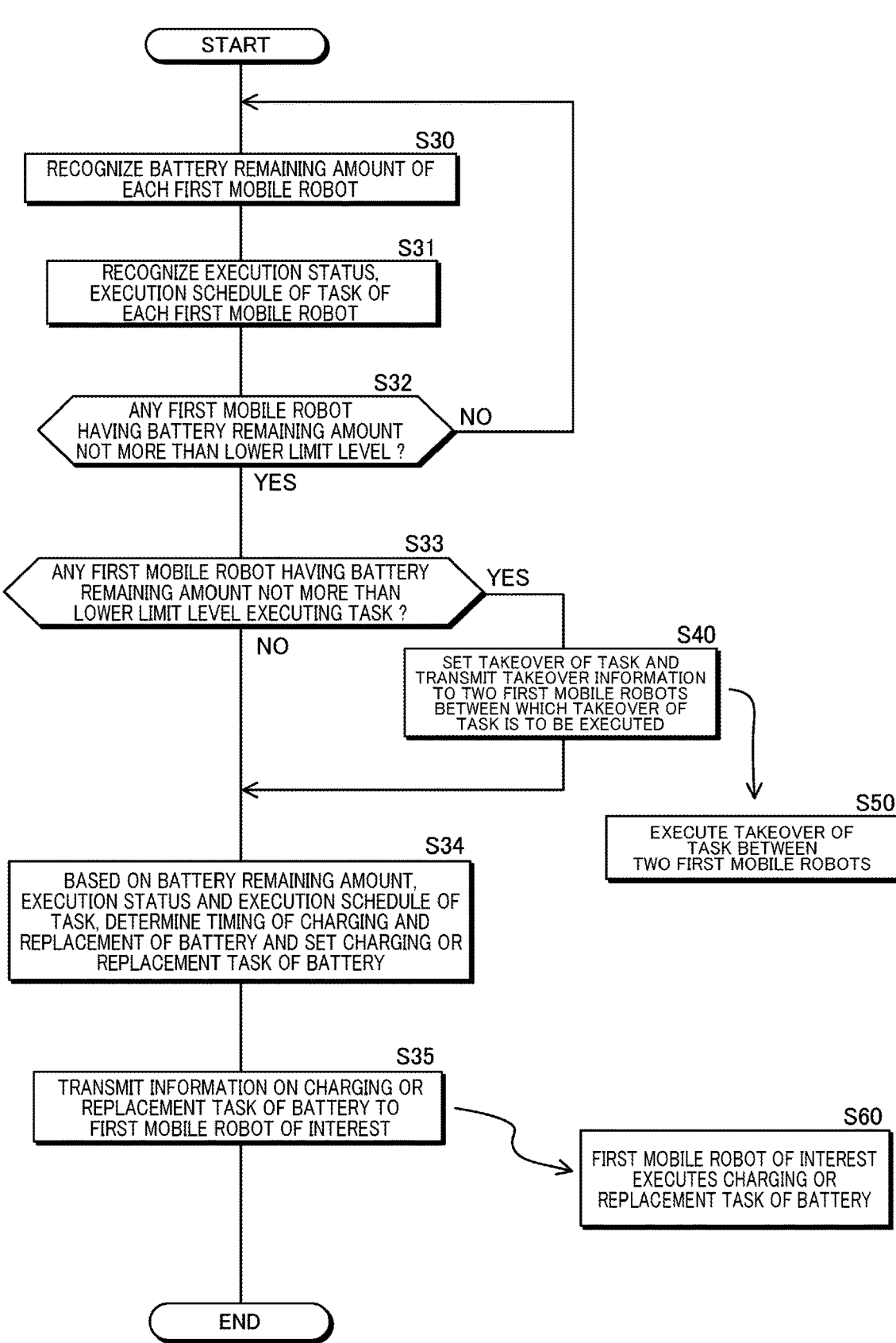
FIG. 4 is a flowchart of management processing of battery remaining amount of each mobile robot.

In the above embodiments, as shown in FIG. 4, the management processing of the battery remaining amounts of the first mobile robot 61 and the second mobile robot 62 is executed; however, even in the case of executing no management processing of the battery remaining amount, the advantageous effects of the present invention can also be attained.

For easy understanding of the present invention, FIG. 2 is a schematic view showing the functional configurations of the robot management system 1, which are divided in accordance with the major processing contents. The robot management system 1 may be formed from being divided differently. In addition, the processing of each component may be executed by one hardware unit or may be executed by a plurality of hardware units. The processing by each component shown in FIGS. 3, 4 may be executed by one program or may be executed by a plurality of programs.

6. Configurations Supported by the Above Embodiments

The above embodiments are specific examples of the following configurations.

(Item 1) A robot management system including: a first robot management unit that manages an activity of a first mobile robot taking a first area as an activity range and executing a task involving movement in the first area; a second robot management unit that manages an activity of a second mobile robot taking a second area as an activity range and executing a task involving movement in the second area partially overlapping with the first area; a wide area task accepting unit that accepts a wide area task involving movement from a first point in the first area to a second point in the second area; and a narrow area task setting unit that, when the wide area task is accepted by the wide area task accepting unit, sets a first narrow area task and a second narrow area task, the first narrow area task including movement from the first point to a relay point located in the overlap area between the first area and the second area, and takeover processing to the second mobile robot at the relay point for supporting the second mobile robot to move to the second point, the second narrow area task including the takeover processing from the first mobile robot at the relay point, the first robot management unit arranging execution of the first narrow area task by the first mobile robot when the first narrow area task is set by the narrow area task setting unit, and the second robot management unit arranging execution of the second narrow area task by the second mobile robot when the second narrow area task is set by the narrow area task setting unit.

According to the robot management system of Item 1, the management target by the first robot management unit is limited to the activity of the first mobile robot within the first area, and the management target by the second robot management unit is limited to the activity of the second mobile robot within the second area. Accordingly, it is possible to provide the robot management system capable of simplifying the configurations of the first robot management unit and the second robot management unit, to thereby more efficiently manage execution of tasks involving movement in a wide range by the mobile robots with a simple configuration.

(Item 2) The robot management system according to Item 1, wherein the takeover processing includes processing of providing information on an execution history of the first narrow area task to the second mobile robot from the first mobile robot.

According to the robot management system of Item 2, it is possible to recognize the status of the first narrow area task executed by the first mobile robot before the takeover, on the second mobile robot side.

(Item 3) The robot management system according to Item 2, wherein the first mobile robot operates in accordance with a remote control by a first user, and the information on the execution history of the first narrow area task includes information on the remote control performed by the first user when the first narrow area task is executed.

According to the robot management system of Item 3, it is possible to recognize the status of the remote control on the first mobile robot performed by the first user before the takeover, on the second mobile robot side.

(Item 4) The robot management system according to any one of Items 1 to 3, wherein the first robot management unit manages battery remaining amounts of a plurality of the first mobile robots and determines a timing of charging each first mobile robot based on a battery remaining amount of each first mobile robot and a priority of a task in execution or scheduled to be executed of each first mobile robot.

According to the robot management system of Item 4, it is possible to determine the timing of charging the batteries of the plurality of first mobile robots depending on the status of each first mobile robot.

(Item 5) The robot management system according to any one of Items 1 to 4, wherein the first robot management unit manages battery remaining amounts of a plurality of the first mobile robots and arranges takeover of a task in execution between a plurality of the first mobile robots depending on the battery remaining amounts.

According to the robot management system of Item 5, it is possible to prevent that the task in execution by any of the first mobile robots cannot be continued due to shortage of the battery remaining amount.

(Item 6) The robot management system according to any one of Items 1 to 5, wherein the second robot management unit manages battery remaining amounts of a plurality of the second mobile robots and determines a timing of charging each second mobile robot based on a battery remaining amount of each second mobile robot and a priority of a task in execution or scheduled to be executed of each second mobile robot.

According to the robot management system of Item 6, it is possible to determine the timing of charging the batteries of a plurality of the second mobile robots depending on the status of each second mobile robot.

(Item 7) The robot management system according to any one of Items 1 to 6, wherein the second robot management unit manages battery remaining amounts of a plurality of the second mobile robots and arranges takeover of a task in execution between a plurality of the second mobile robots depending on the battery remaining amounts.

According to the robot management system of Item 7, it is possible to prevent that the task in execution by any of the second mobile robots cannot be continued due to shortage of the battery remaining amount.

(Item 8) The robot management system according to any one of Items 1 to 7, including a takeover information management unit that manages, by a block chain, information provided to the second mobile robot from the first mobile robot through the takeover processing.

According to the robot management system of Item 8, the takeover processing prevents the information provided to the second mobile robot from the first mobile robot from being tampered.

(Item 9) The robot management system according to any one of Items 1 to 8, wherein the first area and the second area are set in one building of collective housing or an area within a predetermined radius from a predetermined reference point.

According to the robot management system of Item 9, it is possible to limit the management of the activities of the first mobile robot and the second mobile robot to per building of collective housing or to an area within a predetermined range from a reference point.

(Item 10) The robot management system according to any one of Items 1 to 9, wherein the first mobile robot and the second mobile robot are transport robots that transport an object.

According to the robot management system of Item 10, it is possible to perform the relay from the first mobile robot to the second mobile robot and thereby an object can be transported in a wide-range area.

(Item 11) The robot management system according to any one of Items 1 to 10, wherein the first mobile robot and the second mobile robot are telepresence robots that are remotely controlled by a user terminal used by a user, and an image captured by the first mobile robot and an image captured by the second mobile robot are displayed on a display unit of the user terminal.

According to the robot management system of Item 11, it is possible to perform the relay from the first mobile robot to the second mobile robot and thereby the user can communicate with a person or persons present in a wide-range area.

REFERENCE SIGNS LIST 1 robot management system, 10 system processor, 11 first robot management unit, 12 second robot management unit, 13 narrow area task accepting unit, 14 wide area task accepting unit, 15 narrow area task setting unit, 30 memory, 31 delivery request DB, 32 task history DB, 33 maintenance DB, 35 control program, 52 first terminal, 53 second terminal,
61 first mobile robot, 62 second mobile robot, 63 second mobile robot, 71, 75 battery, 100 first store, 102 charging station, 120 relay station, 200 second store, 202 battery station, 300 collective housing, 400 delivery management system, A1 first area, A2, A3 second area, A12 overlap area,
U1 first operator, U2 second operator.

The invention claimed is:

1. A robot management system comprising a processor that includes:

a first robot management unit that manages an activity of a first mobile robot taking a first area as an activity range and executing a task involving movement in the first area;

a second robot management unit that manages an activity of a second mobile robot taking a second area as an activity range and executing a task involving movement in the second area partially overlapping with the first area;

a wide area task accepting unit that accepts a wide area task involving movement from a first point in the first area to a second point in the second area; and a narrow area task setting unit that, when the wide area task is accepted by the wide area task accepting unit, sets a first narrow area task and a second narrow area task, the first narrow area task including movement from the first point to a relay point located in an overlap area where the first area and the second area are overlapping, and takeover processing to the second mobile robot at the relay point for supporting the second mobile robot to move to the second point from the relay point, the second narrow area task including the takeover processing from the first mobile robot at the relay point, the first robot management unit arranging execution of the first narrow area task by the first mobile robot when the first narrow area task is set by the narrow area task setting unit, and the second robot management unit arranging execution of the second narrow area task by the second mobile robot when the second narrow area task is set by the narrow area task setting unit, the first robot management unit manages battery remaining amounts of a plurality of the first mobile robot, determines whether or not there is any first mobile robot having a battery remaining amount equal to or less than a predetermined first lower limit level and whether or not the first mobile robot having the battery remaining amount equal to or less than the predetermined first lower limit level is executing the first narrow area task, when the first mobile robot having the battery remaining amount equal to or less than the predetermined first lower limit level is executing the first narrow area task, arranges takeover of the first narrow area task in execution between two first mobile robots, of the plurality of the first mobile robot, that will execute the takeover, depending on the battery remaining amounts, and transmits takeover information to the first two first mobile robots, the second robot management unit manages battery remaining amounts of a plurality of the second mobile robot, determines whether or not there is any second mobile robot having a battery remaining amount equal to or less than a predetermined second lower limit level and whether or not the second mobile robot having the battery remaining amount equal to or less than the predetermined second lower limit level is executing the second narrow area task, when the second mobile robot having the battery remaining amount equal to or less than the predetermined second lower limit level is executing the second narrow area task, arranges takeover of the second narrow area task in execution between two second mobile robots, of the plurality of the second mobile robot, that will execute the takeover, depending on the battery remaining amounts, and transmits the takeover information to the two second mobile robots.

2. The robot management system according to claim 1, wherein the second robot management unit determines a timing of charging each second mobile robot based on the battery remaining amount of each second mobile robot and a priority of a task in execution or scheduled to be executed of each second mobile robot.

3. The robot management system according to claim 1, wherein the processor further includes a takeover information management unit that manages, by a block chain, information provided to the second mobile robot from the first mobile robot through the takeover processing.

4. The robot management system according to claim 1, wherein the first robot management unit determines a timing of charging each first mobile robot based on the battery remaining amount of each first mobile robot and a priority of a task in execution or scheduled to be executed of each first mobile robot.

5. The robot management system according to claim 1, wherein the first area and the second area are set in one building of collective housing or an area within a predetermined radius from a predetermined reference point.

6. The robot management system according to claim 1, wherein the first mobile robot and the second mobile robot are transport robots that transport an object.

7. The robot management system according to claim 1, wherein the first mobile robot and the second mobile robot are telepresence robots that are remotely controlled by a user terminal used by a user, and an image captured by the first mobile robot and an image captured by the second mobile robot are displayed on a display unit of the user terminal.

8. The robot management system according to claim 1, wherein wherein the processor causes the takeover information to be transmitted from the first mobile robot to the second mobile robot at the relay point, the takeover information including: information on an execution history of the first narrow area task; and information on moving from the relay point to the second point in the second area.

9. The robot management system according to claim 8, wherein the first mobile robot operates in accordance with a remote control by a first user, and the information on the execution history of the first narrow area task includes information on the remote control performed by the first user when the first narrow area task is executed.

* * * * *